United States Patent [19]
Terrell

[11] 3,812,879

[45] May 28, 1974

[54] VENT VALVE

[75] Inventor: Melvin Leon Terrell, Los Angeles, Calif.

[73] Assignee: International Telephone and Telegraph Corporation, New York, N.Y.

[22] Filed: May 21, 1973

[21] Appl. No.: 361,880

[52] U.S. Cl............................ 137/512.15, 137/525
[51] Int. Cl............................................. F16k 15/14
[58] Field of Search...................... 137/525, 512.15

[56] References Cited
UNITED STATES PATENTS

| 2,640,481 | 6/1953 | Conley | 137/525 X |
| 3,358,915 | 12/1967 | Beck et al. | 137/512.15 X |

FOREIGN PATENTS OR APPLICATIONS

| 545,676 | 9/1957 | Canada | 137/525 |
| 975,788 | 10/1950 | France | 137/525 |
| 1,222,052 | 2/1971 | Great Britain | 137/525 |

Primary Examiner—William R. Cline
Attorney, Agent, or Firm—A. Donald Stolzy

[57] ABSTRACT

A vent valve including a circular rubber disc clamped around the exhaust port of a dump valve for use in an anti-skid brake control system. The dump valve has a lip around the port over which the disc is clamped. The disc is clamped by an annular flange of a circular plate. The disc has slots between the clamping position and the port. The plate has an offset central portion with holes therethrough partially aligned with the slots. The central portion of the plate keeps the disc from ballooning and rupturing.

1 Claim, 7 Drawing Figures

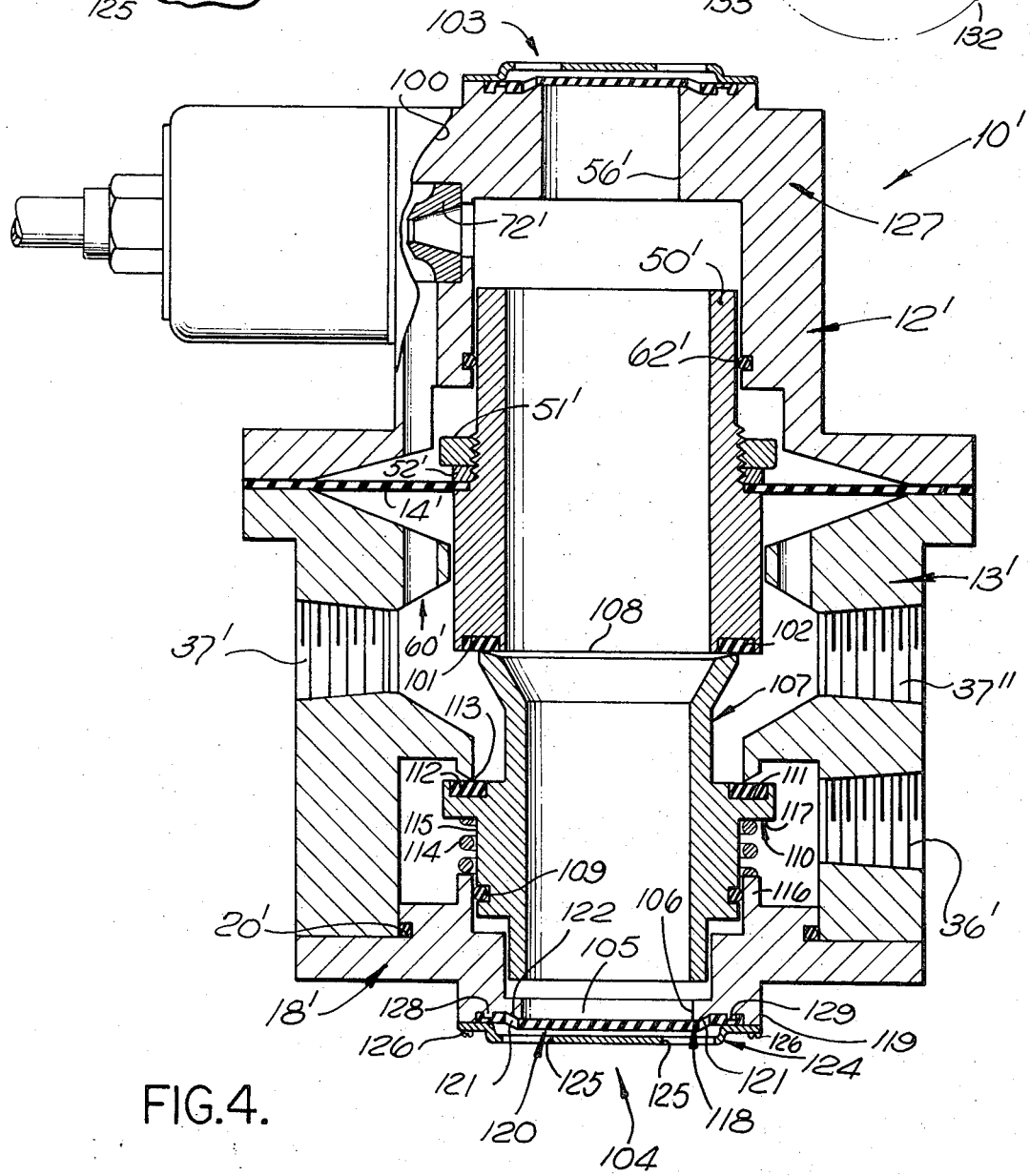

3,812,879

VENT VALVE

BACKGROUND OF THE INVENTION

This invention relates to valves for dumping air from air brakes or the like, and more particularly, to exhaust valves or the like.

In the past, it has been difficult to construct prior art vent valves of a moderately small size which will function properly as vent valves.

SUMMARY OF THE INVENTION

In accordance with the valve of the present invention, the above-described and other disadvantages of the prior art are overcome by providing a vent valve including an elastic membrane stretched or otherwise held over or against a lip around the exhaust port of a dump valve or the like.

One feature of the present invention resides in providing securing means holding the membrane near to and preferably stretched over the lip.

The membrane is preferably secured to the valve body at a location around the port spaced from the lip.

One or more slots are then preferably provided through the membrane at a location between the lip and the securing location.

Another feature of the invention resides in the use of an apertured plate to prevent the membrane from ballooning and rupturing.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 4 is a vertical sectional view of a valve constructed in accordance with the present invention;

FIG. 5 is a broken away bottom plan view of the valve of FIG. 4;

FIG. 7 is a top plan view of a portion of an alternative embodiment of the present invention.

DESCRIPTION OF THE PREFERRED EMBODIMENT

Figure 1:
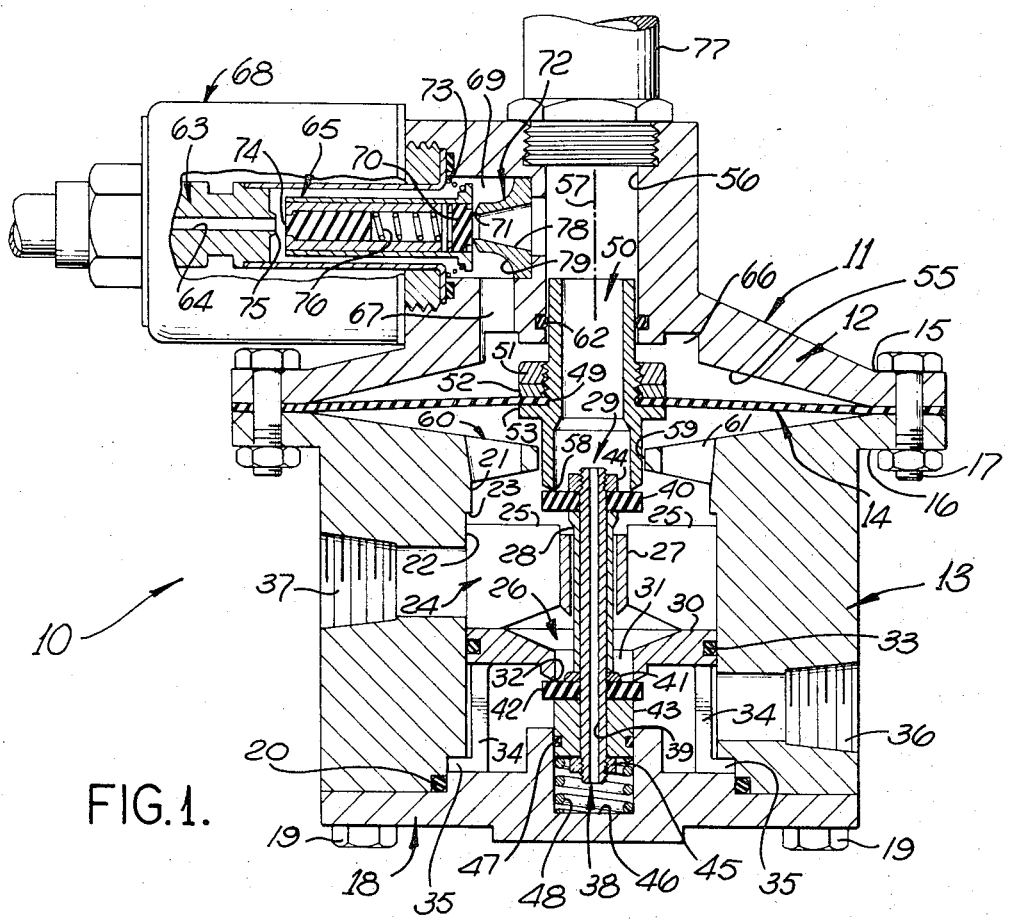
FIG. 1 is a vertical sectional view of a diaphragm valve.

In the drawings, in FIG. 1, a diaphragm valve is indicated at 10 having a body 11. Body 11 includes a bonnet 12 and a base portion 13. A diaphragm 14 has its edge fixed between circular flanges 15 and 16 of bonnet 12 and base portion 13, respectively, by bolts 17. Body 11 also includes a lower end plate 18 which is fixed to base portion 13 by cap screws 19. End plate 18 is sealed to base portion 13 by an O-ring 20.

Figure 2:
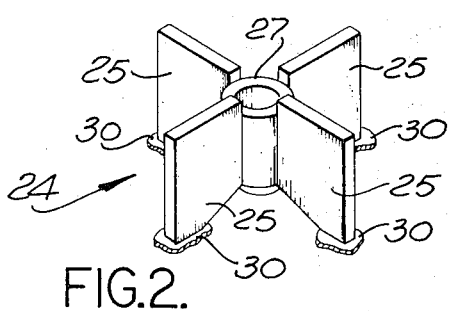
FIGS. 2 and 3 are perspective views of two different but integrally die cast and machined spiders employed in the valve of FIG. 1.
Figure 3:
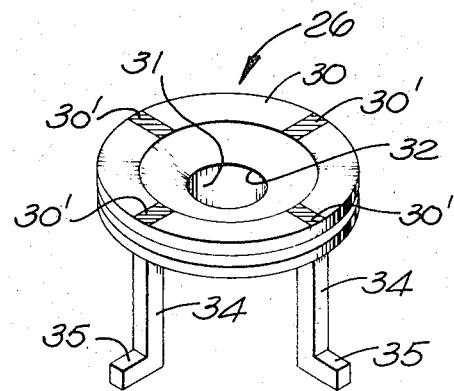

Base portion 13 has a cylindrical bore 21 and a counterbore 22 slightly larger than bore 21 reaching a shoulder at 23. Valve 10 includes a spider 24 that has vanes 25 integral with a plate 30 of a spider 26 at 30' in FIG. 3. See both of FIGS. 2 and 3. Vanes 25 are integral with a cylinder 27 through which a sleeve 28 of a poppet 29 is slidable. See FIGS. 1 and 2. Spider 24 is shown in FIG. 2. Spider 26 is shown in FIG. 3 including plate 30 having a hole 31 therethrough surrounded by a valve seat 32, as shown in FIG. 1. Plate 30 is sealed to bore 22 by an O-ring 33. Spider 26 also has four legs 34 with feet 35 integral therewith. Legs 34 are integral with plate 30. Feet 35 are clamped between base portion 13 and plate 18. Base portion 13 has an inlet port 36, and an outlet port 37. Two or more outlet ports 37 may be provided, if desired. Typically, air under a pressure of 130 pounds per square inch may be supplied through inlet port 36.

Poppet 29 includes a hollow tube 38 having a passageway 39 extending completely therethrough. A valve disc 40 is positioned around tube 38 above sleeve 28. A washer 41, a valve disc 42 and a member 43 are positioned in succession around tube 38 below sleeve 28. A nut 44 is threaded onto the exterior of the lower end of tube 38. Nuts 44 and 45 are, thus, tightened. This places tube 38 in tension, and it places all the structures therearound in compression.

Plate 18 has a recess 46 therein which is cylindrical. Member 43 is likewise cylindrical. Member 43 is, thus, slidable in recess 46. An O-ring 47 provides a fluid tight seal between member 43 and recess 46. A helically coiled spring 48 is positioned in recess 46 to bias poppet 29 to its uppermost position, as shown in FIG. 1.

Diaphragm 14 has a circular hole 49 therethrough. A sleeve 50 is fixed through hole 49 to diaphragm 14 by a nut 51 threaded to sleeve 50. Nut 51 presses a washer 52 against diaphragm 14, and diaphragm 14 against a flange 53 integral with sleeve 50.

A frusto-conical polyurethane sponge 54 is positioned between the upper side of diaphragm 14 and a mating, internal frusto-conical surface 55 of bonnet 12.

Bonnet 12 has a bore 56. Bore 56 has a cylindrical surface. The cylindrical surface of bore 56 has an axis 57. If desired, many parts of this construction shown in FIG. 1 may be symmetrical about axis 57, as shown.

As can be seen in FIG. 1, disc 42 acts as a valve which seals off hole 31 by engaging valve seat 32. Similarly, disc 40 seals off the hollow interior of sleeve 50 by engaging a valve seat 58 at the lower end thereof.

The lower end of sleeve 50 is guided through a cylindrical opening 59 through a spider 60 integral with base portion 13 having, for example, eight holes 61 therethrough.

Sleeve 50 is also slidably guided in bore 56. An O-ring 62 provides a fluid tight seal between the external surface of sleeve 50 and bore 56.

A body 63 is fixed relative to body 11. Body 63 has an inlet passageway 64. Air is admitted to passageway 64 in accordance with brake pedal pressure, as is conventional. This pressure may vary, for example, from 0 to 100 pounds per square inch. Air through passageway 64, when plunger 65 is in the position shown, may enter a space 66 above diaphragm 14 through a cylindrical port 67 in bonnet 12. Air can arrive at port 67 because plunger 65 is loosely retained inside a solenoid housing 68. Air exiting from passageway 64 to the right, as viewed in FIG. 1, may thus flow around plunger 65 to a space 69 to the right thereof, and into the port 67. Plunger 65 has a valve disc 70 which is biased into engagement with a seat 71 on a fitting 72 by a coiled spring 73. Fitting 72 is fixed to and sealed to bonnet 12.

A valve 74 is capable of resting on a valve seat 75 on body 63. A spring 76 normally biases valve 74 to the position shown in FIG. 1, but allows it to remain substantially on seat 75 while the remainder of plunger 65 moves to the left a small amount.

Air in space 66 may be exhausted to the atmosphere from brake cylinders connected with port 37 through sleeve 50, through bore 56 and through a vent valve 77.

Faster dumping is also obtained by employing the frusto-conical internal surface 78 of fitting 72, as shown in FIG. 1. The same is true of the tangency of the external surface 79 to the internal surface of port 67.

In the operation of the valve 10 shown in FIG. 1, diaphragm 14 may be in the position shown. Diaphragm 14 is flexible and may or may not be made of rubber or a rubber-like material. When brake pedal pressure is applied, pressure is supplied through passageway 64, and diaphragm 14 moves downwardly. This keeps disc 40 in sealing engagement with seat 58 but pushes disc 42 away from seat 32. The pressure in inlet 36 is then allowed to enter the brake cylinders through port 37. As soon as the pressure below diaphragm 14 becomes equal to the pressure thereabove, disc 42 again engages seat 32. As the pressure in passageway 64 is vented to atmosphere, the pressure below diaphragm 14 will exceed that in space 66. Diaphragm 14 will then lift seat 58 off of disc 40, and the space below diaphragm 14 will be vented to the atmosphere through sleeve 50, bore 56 and vent valve 77.

Now assume again that brake pedal pressure is applied and pressure is supplied through passageway 64. In the meantime, the anti-skid brake control system calls for a release of brake pressure by the energization of the solenoid 58. In this case, valve 74 will close against seat 75, and disc 70 will move away from seat 71. Air under pressure in space 66 will then be vented to atmosphere through port 67, through the hole in fitting 72, into bore 56 and outwardly of vent valve 77. Diaphragm 14 will then move up and lift seat 58 off of disc 40, and vent the space below diaphragm 14 to the atmosphere, as before, through sleeve 50, bore 56 and vent valve 77.

This is the rate at which the pressure is reduced below diaphragm 14 when seat 58 is lifted off of disc 40. However, the dumping rate, during computer control of solenoid 68, is also dependent upon the rate at which the pressure in space 66 is dumped through point 67, through fitting 72, through bore 56 and through vent valve 77. That is the reason that the shape of surface 78 and the tangency of surface 79 with the surface of point 67 are important.

Note will be taken that venting of recess 46 through passageway 39 is necessary because O-ring 47 provides a seal, and the size of the space in recess 46 is variable with the position of poppet 29. Such an air tight space would inhibit the operation of poppet 29, were not recess 46 vented.

In FIG. 4, a diaphragm valve 10' constructed in accordance with the present invention has a bonnet 12', a base portion 13' and a lower end plate 18'. Valve 10' is cut away along a line 100. Valve 10' may be identical to valve 10 shown in FIG. 1 to the left of the line 100 shown in FIG. 4, if desired.

In FIG. 4, a diaphragm is illustrated at 14'.

Parts 12', 13', 18', 14', 50', 51', 52', 62' and 72' shown in FIG. 4 may be similar to parts 12, 13, 18, 14, 50, 51, 52, 62 and 72 shown in FIG. 1, respectively. In some instances, a part shown in FIG. 4 may be identical to the corresponding part shown in FIG. 1.

Base portion 13' has two outlet ports 37' and 37".

A spider 60', shown in FIG. 4, may be similar to or identical to spider 60 shown in FIG. 1.

Sleeve 50' in FIG. 4 may be similar to or identical to sleeve 50 in FIG. 1 except for an annular groove 101 in the lower end of sleeve 50' in which a valve seat 102 is sealed and fixed.

Bonnet 12' in FIG. 4 has a bore 56' which may be similar to or identical to bore 56 shown in FIG. 1. Air is exhausted through bore 56', as before. A vent valve 103 covers the upper end of bore 56'. A similar vent valve 104 covers an opening 105 of a port 106 through end plate 18'.

Vent valves 103 and 104 may be identical, if desired. Thus, only vent valve 104 will be described in detail.

Base portion 13' has an inlet port 36' which may be similar to or identical to inlet port 36 shown in FIG. 1.

A valve 107, having a hollow interior and being open at both ends, has a circular sharp upper edge 108 that engages valve seat 102. Valve 107 is sealed to end plate 18' by an O-ring 109. Valve 107 has an outwardly projecting radial flange 110 with an annular groove 111 therein. Groove 111 has a rubber ring 112 fixed and sealed in groove 111.

Base portion 13' has a downwardly extending sharp circular edge 113 which bears against and seals with ring 112.

A helically coiled spring 114 fits contiguous to a cylindrical external surface 115 of valve 107 and rests on an upwardly extending cylindrical projection 116 integral with end plate 18'.

Spring 114 then bears against the lower annular surface 117 of flange 110 and spring biases ring 112 against the circular edge 113.

An O-ring 20' provides a fluid tight seal between body portion 13' and end plate 18'.

Bonnet 12' and base portion 13' are fixed together with diaphragm 14' by means not shown. This means may include, for example, bolts similar to or identical to bolts 17 shown in FIG. 1. Base portion 13' and end plate 18' may be fixed together by cap screws similar to or identical to cap screws 19 shown in FIG. 1.

The cylindrical internal surface of end plate 18' which defines port 106 may or may not be cylindrical, as desired. However, if this surface is cylindrical, it has an axis of symmetry which is generally the same axis of symmetry of valves 103 and 104, as well.

As shown in FIG. 4, vent valve 104 may include a lip 118 integral with end plate 18'. End plate 18' has a boss 119. The lower end of boss 119 may be an absolutely flat annular surface in a plane perpendicular to the said axis of symmetry, the said axis of symmetry being referred to hereinafter as the axis.

Notwithstanding the foregoing, the lower end surface of boss 119 is not shown flat in FIG. 4.

Vent valve 104 includes a rubber membrane 120 which has four spaced and, more or less, symmetrical arcuate slots 121, as shown both in FIGS. 4 and 5.

In FIG. 4, note will be taken that lip 118 has a frusto-conical surface 122. Slots 121 always lie in a position such that membrane 120 completely engages the entire circumference of the extreme lower edge of lip 118 to act as a dust cover when air is not being exhausted through vent valve 104. In other words, radius 123 shown in FIG. 5 is always as great as, and preferably greater than, the inside radius of the cylindrical surface of end plate 18' which defines port 106. However, this occurs only when air is not being exhausted through vent valve 104. When air is being exhausted through vent valve 104, the central portion of membrane 120, as viewed in FIG. 4, presses downwardly against the upper surface of a plate 124. Membrane 120 is then blown off of lip 118 and allows air to be exhausted through slots 121. When so exhausted, this air passes through circular holes 125 in plate 124 that are partially aligned with slots 121, as shown in both FIGS. 4 and 5.

Plate 124 is fixed to end plate 18' by cap screws 126.

Bonnet 12' has an upper portion 127 at which location vent valve 103 is mounted.

In the practice of the embodiment of the invention illustrated in FIG. 4, at least one, but not necessarily both, of vent valves 103 and 104 are preferably employed. Both of the vent valves 103 and 104 need not be employed. Either one of the vent valves 103 and 104 may be omitted.

In FIG. 4, end plate 18' has an annular projection 128. Membrane 120 also has a groove 129 which fits over projection 128. Plate 124 clamps membrane 120 tightly against the lower end of boss 119 with annular groove 129 in membrane 120 fitted tightly over projection 128 of end plate 18'.

Figure 6:
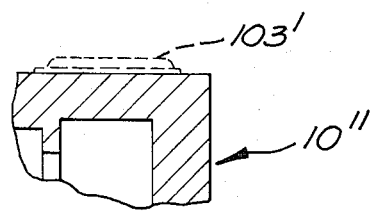
FIG. 6 is a sectional view of a portion of an alternative embodiment of the present invention.

In an alternative construction indicated at 10" in FIG. 6, vent valve 103 has been omitted. The construction of valve 10", shown in FIG. 6, may be identical to that of valve 10', shown in FIG. 4, except for the structure illustrated in FIG. 6. In FIG. 6, a vent valve 103' would have a location approximately as indicated if it were employed. However, no such vent valve 103' is employed in FIG. 6.

In FIG. 7, a construction alternative to that of membrane 120 of FIG. 4 is illustrated at 120' including radial projections 130 having slots 131 between immediately adjacent projections. The inside and outside diameter between which lip 118 is located are illustrated at 132 and 133, respectively. Each projection has a groove 129' similar to groove 129 in FIG. 4.

The word "slot," as used herein and as used in the claims, is hereby defined to include, but not be limited to, a slot 121 and an equivalent thereof, and a slot 131 and an equivalent thereof.

The word "lip" is hereby defined for use herein and for use in the claims to include, but not be limited to, all or any portion of lip 118, or a lip which is defined at the intersection of a mathematical circular cylinder by a plane perpendicular to the cylinder axis.

The phrase "closed curve" is hereby defined for use herein and for use in the claims as being unlimited in shape. For example, the membrane of the present invention in a top plan view may be square, rectangular, circular, triangular, polygonal, with or without a precisely uniform thickness. In other words, the phrase "closed curve" may be employed to define the shape of the perimeter of a membrane constructed in accordance with the present invention without regard to whether or not the membrane has a symmetrical or regular shape.

The words "dimension" and "displacement" are hereby defined for use herein and for use in the claims to include, but not be limited to, either linear measure or angular measure.

The word "hole," as used herein and as used in the claims, is hereby defined to include, but not be limited to, a slot.

What is claimed is:

1. A vent valve comprising: a body having an external surface and a port which interrupts said external surface at an opening, said port being adapted to conduct a fluid from the interior of said body to the exterior thereof in a predetermined direction extending from a location within said port to the exterior of said body through the said opening; a fluid impervious elastic membrane; a lip having an outer edge, said lip being located around said opening fixed relative to said body in a position with said lip edge engaging one side of said membrane, said lip projecting from said external surface in said predetermined direction; and securing means holding the periphery of said membrane in a fixed position relative to said housing, said membrane having at least one slot extending completely through the thickness thereof at a location on the outside of said lip which is opposite that side thereof on which said opening is located, said membrane lifting off of said lip when a first fluid pressure inside said port is larger than a second fluid pressure adjacent said membrane on the side thereof opposite the side which engages said lip, fluid in said port being dumped through said slot when said membrane is lifted off of said lip as aforesaid, said securing means holding said membrane in contact with said lip when said first and second pressures are equal, said membrane having an imperforate central portion inside said lip and covering said port when said first and second pressures are equal, said port being defined within said body by a cylindrical internal surface thereof, said internal surface having an axis which extends in said predetermined direction, said lip having a circular edge in a predetermined plane perpendicular to said axis, said edge being symmetrical with said axis, said membrane being made of rubber, said membrane having an annular marginal edge portion fixed relative to said body external surface around said lip by said securing means, said membrane having a circular central portion location concentrically with said axis when said first and second pressures are equal, said membrane having at least three slots in addition to said one slot, all of said slots being of the same size and shape, all of said slots being equally spaced radially and circumferentially around said axis, all of said slots being arcuate, the inside radius of said slots being less than that of said cylindrical surface, said body having an annular surface around said opening spaced from said predetermined plane in a direction therefrom opposite said predetermined direction, said securing means clamping said membrane marginal edge portion in engagement with said annular surface, said securing means including a plate of uniform thickness and being fixed relative to said body, said plate having a flat circular portion and an annular flange connected thereto by a cylindrical portion, said annular flange being held in pressure contact with said membrane marginal portion, said slots being spaced from and located wholly between the inside diameter of said plate cylindrical portion and the inside diameter of said port, said plate having a hole through the said circular portion thereof in at least partial alignment with each said slot, said plate circular portion having a central portion to support said membrane when said first pressure exceeds said second pressure and said membrane is blown thereagainst and to prevent said membrane from ballooning and bursting, said body annular surface having an annular projection thereon extending in said predetermined direction, said membrane marginal portion having an annular groove fitted over said body annular projection and held in pressure contact thereagainst by said plate flange, said securing means including at least a plurality of equally spaced screws holding said plate in a fixed position in pressure contact with said body.

* * * * *